United States Patent [19]  [11] 4,004,063
Peterson et al.  [45] Jan. 18, 1977

[54] AQUEOUS ENAMEL FOR COATING MAGNET WIRE

[75] Inventors: Marvin A. Peterson, Fort Wayne, Ind.; Oliver I. Cline, Burnsville, Minn.

[73] Assignee: General Electric Company, Fort Wayne, Ind.

[22] Filed: Dec. 31, 1974

[21] Appl. No.: 537,650

[52] U.S. Cl. .................. 428/383; 260/29.2 E; 260/29.2 N; 260/75 N; 427/388 R; 427/409

[51] Int. Cl.$^2$ .................................. C08L 67/02

[58] Field of Search ............ 260/29.2 E, 29.2 N, 260/75 N; 428/379, 383; 427/388, 409

[56] References Cited

UNITED STATES PATENTS

| 3,426,098 | 2/1969 | Meyer et al. | 428/379 |
| 3,652,500 | 3/1972 | Peterson | 260/29.2 N |
| 3,663,510 | 5/1972 | Peterson | 260/29.2 N |
| 3,695,929 | 1/1972 | Sattler | 428/383 |

Primary Examiner—John C. Bleutge
Attorney, Agent, or Firm—Joseph E. Papin

[57] ABSTRACT

A magnet wire enamel composition for application to magnet wire in a wire tower comprises an aqueous solution of:

a. a water soluble polyester resin derived as the reaction product of:
 18 to 47 mole percent neopentylglycol,
 8 to 38 mole percent trimethylolpropane, or trimethylolethane or mixtures thereof,
 19 to 38 mole percent isophthalic acid,
 0 to 14 mole percent adipic acid, and
 7 to 14 mole percent trimellitic anhydride; and b. a water soluble orthoamic acid diamine oligomer derived as the reaction product of:
 $m$ moles methylene dianiline, and
 ($m-1$) moles 4,4'-(2-acetoxy-1,3-glyceryl)-bis-anhydrotrimellitate, where $m$ has a value of from 2 to about 7.

The polyester resin has an acid value of from about 45 to about 100 with a preferred range of from 50 to 70; and a hydroxyl value of from about 150 to 300, with a preferred range of 250 to 300. The polyester resin and orthoamic acid diamine oligomer are in proportions of from about 1 to about 20 to 1, and preferably about 9 to 1. The coating composition contains between about 25% to about 40% solids by weight, and the solvent constitutes about 80% water. Accelerators and flow control agents may be added. The composition is applied as an enamel to a wire and the wire cured in a wire tower to produce an insulated magnet wire.

30 Claims, 2 Drawing Figures

AQUEOUS ENAMEL FOR COATING MAGNET WIRE

FIELD OF THE INVENTION

The present invention relates to an improved magnet wire enamel composition. More particularly, the present invention relates to aqueous based polymeric coating solutions containing water soluble polyesters or polyesterimides, or mixtures thereof, in admixture with oligomeric orthoamic acid diamines which solutions find particular but not necessarily exclusive utility as magnet wire enamel compositions. Coatings produced from the aqueous based polymeric coating solutions are readily applicable to magnet wire in conventional wire tower coating and curing apparatus and result in magnet wire coatings having the desired degree of thermal stability, dielectric strength and cut-through temperature, and are suitable for overcoating with conventional materials such as Nylon.

BACKGROUND OF THE INVENTION

Coating compositions for application to magnet wire and like substrate materials are well known in the art. See, for example, U.S. Pat. No. 2,936,296, issued May 10, 1960, to F. M. Precopio and D. W. Fox for "Polyesters From Terephthalic Acid, Ethylene Glycol and a Higher Polyfunctional Alcohol"; U.S. Pat. No. 3,652,500, issued Mar. 28, 1972, to M. A. Peterson for "Process For Producing Polyamide Coating Materials By Endcapping"; U.S. Pat. No. 3,663,510, issued May 16, 1972, to M. A. Peterson for "Process for Producing Polyamide Coating Materials"; U.S. Pat. No. 3,179,614, issued Apr. 20, 1965, to W. M. Edwards for "Polyamide-Acids, Compositions Thereof, And Process For Their Preparation"; U.S. Pat. No. 3,179,634, issued Apr. 20, 1965, to W. M. Edwards for "Aromatic Polyimides And The Process For Preparing Them "; U.S. Pat. No. 3,426,098, issued Feb. 4, 1969, to J. F. Meyer et al. for 'Polyester-Polyimide Wire Enamel"; U.S. Pat. No. 3,297,785, issued Jan. 10, 1967, to N. J. George et al. for "Melamine-Aldehyde Resin Modified Polyester Reaction Products"; and U.S. Pat. No. 2,787,603, issued Apr. 2, 1957, to P. F. Sanders for "Aqueous Coating Compositions And Substrates Coated Therewith". One of the most widely used, highly successful, and effective magnet wire enamel compositions is that produced in accordance with U.S. Pat. No. 2,936,296, under the trademark "Alkanex" by General Electric Company. The Alkanex composition is highly suitable for use in commercial wire tower applications, and is widely considered as setting the standard in the trade for a large segment of magnet wire production. Notwithstanding the wide spread commercial use and acceptance of the Alkanex magnet wire composition, the composition has the economic and ecological disadvantage of requiring the use of organic solvents.

Where organic solvents are utilized for commercial wire coating applications, they are driven off during curing of the coatings and are generally not economically recoverable. Many such solvents are becoming economically, ecologically and environmentally prohibitive, making it increasingly desirable to utilize substantially water based wire enamels.

For water based wire enamels to be commercially feasible, they must not only result in enamel coatings on magnet wire which reflect properties equal to or better than properties obtainable from Alkanex type magnet wire, but also the aqueous based enamel compositions must be suitable for application to magnet wire in existing commercial wire tower equipment and under the specifications, conditions and parameters utilized for the commercial operation of such equipment. Wire tower equipment for the application of enamel coatings to magnet wire is shown in U.S. Pat. No. 3,351,329, issued Nov. 7, 1967, to D. W. Thomas for "Wire Coating Oven Apparatus"; U.S. Pat. No. 3,183,605, issued May 18, 1965, to D. D. Argue et al. for "Apparatus for Coating Metals"; and U.S. Pat. No. 3,183,604, issued May 18, 1965, to J. D. Stauffer for "Apparatus and Process for Removing Solvent from Coatings on Metal." To the extent necessary for a more complete understanding of the present invention, reference should be made to the above wire tower patents, the disclosure of which is herein incorporated by reference.

Criteria for electrical insulating materials, such as magnet wire insulations, slot insulations, insulating varnishes and the like have been established in the art. In order to determine whether the insulation on a magnet wire will withstand the mechanical, chemical, electrical and thermal stresses encountered in winding machines and electrical apparatus, it is customary to apply the resin to a conductor, by a method which will be described hereinafter, and to subject the enameled wire to a series of tests which have been designed to measure the various properties of the enamel on the wire.

Various tests, which will be described in detail later, include the abrasion resistance tests, the 25 percent elongation plus 3X flexibility test, the snap elongation test, the 70-30 solvent resistance test, the 50—50 solvent resistance test, the dielectric strength tests, the flexibility after heat aging test, the heat shock test, the cut-through temperature test, and the high temperature dielectric strength loss test. The enamel on a conductor which will withstand the mechanical, chemical and electrical stresses encountered in magnet wire applications and which is operable at temperature of at least 135° C. for extended periods of time must withstand at least 10 strokes with the average of three tests being not less than 20 in the repeated scrape abrasion resistance test, must withstand 980 "grams to fail" in the unidirectional scrape resistance test, must pass the 25 percent elongation plus 3X flexibility test, must show no surface defects in the snap test, must show no attack on the insulation in either of the solvent resistance tests, must have a dielectric strength of at least 1500 v. per mil twisted pair, must show no surface defects when wound on an 3X mandrel after heat aging for 100 hours at 175° C., must show no defects when a 5X coil is aged for 30 minutes at 155° C. in the heat shock test, and must have a cut-through temperature of at least 215° C. under a 1000 gram load for 18 AWG heavy coated insulated magnet wire on copper conductor. In addition, for the same type of magnet wire with Nylon overcoat the insulated conductor must not show a loss in dielectric strength of more than ⅔ of original dielectric strength or a minimum of 1500 volts per mil twisted pair, must show no surface defects when a 3X coil is aged for 30 minutes at 155° C. in the heat shock test, and must have a cut-through temperature of at least 200° C. under a 1000 gram load.

The abrasion resistance test, flexibility test, and snap test are employed to determine the mechanical properties of a magnet wire. Abrasion resistance is a measure of the amount of abrasion an insulated electrical conductor will withstand before the insulating enamel is worn away from the conductor. Repeated scrape abrasion resistance is measured by rubbing the side of a loaded round steel needle back and forth across the surface of an insulated electrical conductor until the enamel is worn away. The number of strokes required to wear the enamel away is referred to as the number of abrasion resistance strokes. Unidirectional scrape resistance is measured by rubbing the side of a round steel needle across the surface of an insulated electrical conductor under increasing load until the conductor is exposed. The load required to expose the conductor is referred to as the "grams-to-fail" load. For a complete description of the procedure followed in abrasion resistance testing where a needle is rubbed back and forth across the insulated electrical conductor, reference is made to NEMA Standard Section MW 24 and this NEMA Standard is incorporated herein by reference.

The flexibility of the enamel on a magnet wire is determined by stretching the enameled conductor and examining the stretched portion of the wire under a binocular microscope at a magnification of 10 to determine if there are any imperfections on the surface of the enamel. The imperfections which may be noted on the surface of the enamel are a series of parallel surface lines or fissures which are perpendicular to the long axis of the wire. This condition of the enamel film is known as crazing. Another defect which can sometimes be observed is a break in the enamel film in which the two sections of the film are actually physically separated and the opening extends in depth to the exposed conductor. This defect is called a crack. A third defect which may be noted is a mar or blemish in the enamel film.

In the elongation plus flexibility test, an insulated copper electrical conductor having a diameter X is elongated 25 percent and wound about a mandrel having a diameter 3X, 2X, and 1X. In the counterpart insulated aluminum electrical conductor flexibility test, the conductor is elongated 15% and wound on a mandrel having a diameter 3X, 2X and 1X. If examination of the enamel under a magnification of ten shows none of the surface defects noted above at a particular mandrel wind, the insulation on the conductor passes the flexibility test for that particular X.

The snap elongation test measures the ability of the insulation to withstand a sudden stretch to the breaking point of the conductor. The insulation on the conductor must not show any cracks or tubing beyond three test wire diameters on each side of the fracture after the insulated conductor is jerked to the breaking point at the rate of 12 to 16 feet per second (3.66 to 4.88 meters per second).

Solvent resistance tests are conducted to determine whether a magnet wire will satisfactorily withstand the chemical stresses found in electrical applications, i.e., whether the enamel is resistant to the solvents commonly employed in varnishes which may be used as an overcoat for the enameled wires. The solvent resistance test is the determination of the physical appearance of an enameled wire after immersion in a refluxing bath of a specification solution. Two solution systems are used for each sample of wire. Both of these solutions contain a mixture of alcohol and toluene. The alcoholic portion if composed of 100 parts by volume of U.S.P. ethanol and 5 parts by volume of C.P. methanol. One solvent test solution (which is designated as 50–50) consists of equal parts by volume of the above alcohol mixture and of toluene. The second solution (which is designated as 70–30) is 70 parts of the alcohol mixture and 30 parts of toluene.

In the usual operation of the test, about 250 ml. of the solution is placed in a 500 ml. round-bottomed, single-necked flask which is heated by a suitable electrical heating mantle. A reflux condenser is attached to the flask and the solution is maintained at reflux temperature. A sample is formed so that three or more straight lengths of the wire having cut ends can be inserted through the condenser into the boiling solvent. After 5 minutes the wire is removed and examined for blisters, swelling or softening. Any visible change in the surface constitutes a failure. Soft (requiring the thumbnail to remove it) but smooth and adherent enamel is considered to pass the 5-minute test. The samples are then returned to the solvent for another 5 minutes and re-examined for the same defects. If the enamel shows any blisters or swelling at the end of either the 5-minute or the 10-minute test in the 70–30 solution (the 70–30 solvent resistance test) the enamel has failed the solvent resistance test. If the enamel shows any blisters or swelling at the end of the 5-minute test in the 50–50 mixture (the 50–50 solvent resistance test) the enamel has failed this solvent resistance test.

The dielectric strength of the enamel film determines whether the insulation on a magnet wire can withstand the electrical stresses encountered in electrical apparatus. The dielectric strength of an insulating film is the voltage required to pass a finite current through the film. In general, dielectric strength is measured by increasing the potential across the insulating film at a rate of 500 volts per second and taking the root mean square of the voltage at which the finite current flows through the film as the dielectric strength.

The type of specimen employed to measure dielectric strength is a sample made up of two pieces of enameled wire which have been twisted together a specified number of times while held under a specific tension. A potential is then placed across the two conductors and the voltage is increased at the rate of 500 volts per second until a finite current flows through the insulation. The voltage determined by this method is referred to as "dielectric strength, volts (or volts per mil), twisted pair". The number of twists and the tension applied to the twisted wire is determined by the size of the bare conductor. A complete listing of the specifications for various wire sizes are described in the aforementioned NEMA Standard Section MW 24.

In order to determine whether a magnet wire may be employed at high temperatures, it is necessary to measure properties of the enameled conductor at high temperatures. Among the properties which must be measured are the cut-through temperature of the enamel, the flexibility of the enamel after heat aging at an elevated temperature, the heat shock characteristics of the enamel, and the dielectric strength loss of the enamel when heated at high temperature in air. Since it is well known that copper is the most common conductor, all of the thermal tests of magnet wire are conducted on copper magnet wire.

The cut-through temperature of the enamel film is measured to determine whether the insulation on a magnet wire will flow when the wire is raised to an elevated temperature under compressive stress. The cut-through temperature is the temperature at which the enamel film separting two magnet wires, crossed at 90° and supporting a given load on the upper wire, flows sufficiently to establish electrical contact between the two conductors. Since magnet wires in electrical apparatus may be under compression, it is important that the wires be resistant to softening by high temperature so as to prevent short circuits within the apparatus. The tests are conducted by placing two 8 inch lengths of enameled wire perpendicular to each other under a load of 1000 grams at the intersection of the two wires. A potential of 110 volts A.C. is applied to the end of each wire and a circuit which contains a suitable indicator such as a line recorder, a buzzer or neon lamp is established between the ends of the wires. The temperature of the crossed wires and the load is then increased at the rate of 3° per minute until the enamel softens sufficiently so that the bare conductors come into contact with each other and cause the indicator to signal a failure. The temperature at which this circuit is established is measured by a thermocouple extending into a thermowell to a point directly under the crossed wires. The cut-through temperature is taken as the temperature in the thermowell at the moment when the current first flows through the crossed wires. Although this temperature is always somewhat lower than the true temperature of the wires, it gives a fairly accurate measurement of the cut-through temperature range of the enameled wire being tested. Magnet wires designated for operating temperatures of at least 135°C. should have a cut-through temperature of at least 175°C.

When measuring properties of an insulating film such as percent elongation after heat aging, heat shock, weight loss after heating in vacuum, and dielectric strength loss after heating in air, what is actually being measured is the effect of thermal degradation of the enamel on the particular properties being measured. The most straightforward method of measuring this thermal degradation of an enamel on a wire is to maintain the enameled wire at the temperature at which it is desired to operate the wire until decomposition takes place. This method is impractical in the evaluation of new materials, however, because of the relatively long periods of time involved. Thus, it might be found that an enameled wire may operate successfully at a temperature of 135° C., for example, for 5 to 10 years before any substantial thermal degradation takes place. Because it is obviously impractical to wait such a long period of time to find out whether a resin is satisfactory for magnet wire enamel, it is customary to conduct accelerated heat life tests on these enameled wires. Since thermodynamic theories show that the rate of a given reaction can be determined as a function of temperature, it is possible to select elevated temperatures for thermal tests of enamel films and to calculate the thermal properties of the enameled wire at the desired operating temperature from these accelerated test data. Although it might be expected that degradation reactions which occur at elevated test temperature might not occur at temperatures at which the magnet wire is to be operated because of activation energies required to initiate certain reactions, experience has shown that accelerated heat life tests are an accurate method for determining the heat life of a material at operating temperatures.

In determining whether an enamel film will lose its flexibility after extended periods of time at operating temperature, it is customary to heat age a sample of the enameled wire. In practice it has been found that for a magnet wire to be satisfactory for use in dynamoelectric machines at temperatures of at least 135° C. a sample of the enameled wire having a conductor diameter X must show no surface defects when wound on a mandrel having a diameter of 3X after heat aging for 100 hours in a circulating air oven maintained at a temperature of 175° C. It should be appreciated, however, that the value of the heat age test is questionable when the insulated wire includes a Nylon overcoat, and a failure under said circumstances is not indicative of a defect in the base insulation.

The effect of high temperatures on the flexibility of a magnet wire enamel may also be measured by winding a sample of the enameled wire having a conductor diameter X on a mandrel having a diameter of 5X, removing the sample of wire from the mandrel and placing it in a circulating air oven maintained at 155° C. After 30 minutes the sample of wire should show no surface defects in any of the windings in order for the enameled wire to have sufficient flexibility for steady operation at at least 135° C. This test is known as the heat shock test.

The final thermal requirement of a magnet wire which is to be used at elevated temperatures is that the dielectric strength of the enamel film remains sufficiently high at elevated temperatures after a long period of operation so that no short circuits occur between adjacent magnet wires. For a magnet wire to be satisfactory for operation at a temperature of at least 135° C. its dielectric strength should not be less than two-thirds of the initial dielectric strength after being maintained at a temperature of 175° C. for 100 hours in an oven circulating air having a relative humidity of 25 percent at room temperature. This change in dielectric strength is measured as the dielectric strength, volts (or volts per mil) twisted pairs, both before and after the 175° C. heat aging.

The conditions for commercial wire tower operation depend principally upon the type and diameter of the magnet wire being coated, as well as on the characteristics of the coating composition itself. Briefly, for commercially economical operation, the wire tower must apply a wet enamel coating of between about 2.0 and about 3.5 mils on the diameter to magnet wire ranging in size from a diameter of about 0.0022 inch to a diameter of about 0.144 inch. Both copper and aluminum are commonly used magnet wire materials, and it will be appreciated that the wire tower conditions will vary depending upon which material is utilized as a result of the difference in their thermal conductivity. In particular, for aluminum wire the wire speed in the tower will range from 80 to 125 feet per minute for 0.0126 inch diameter wire to 25 to 28 feet per minute for 0.0605 inch diameter wire. For copper wire, the economical tower speeds are 125 feet per minute for 0.0022 inch wire to 16–20 feet per minute for 0.144 inch wire. The temperature zones and ranges in the wire tower must be sufficient to effectively drive off the solvent, principally water, and heat cure the coating. To this end, the wire tower temperatures are set in the bottom, or solvent removal zone, at a level which will remove the solvent without causing bubbles or blisters, and in the top or cure zone at a level which will effect the desired polymerization and cure without damaging the enamel. Those skilled in the operation of wire towers will be readily able to establish the optimum temperature for operation of the tower. It will be apparent to those skilled in the art that the operation of a wire tower must be such as to produce coated wire at a cost which is commercially competitive under the prevailing market conditions. Thus, the ability to coat and cure magnet wire at high speeds and under temperature conditions which will not adversely affect characteristics and properties of the base wire substrate is of substantial commercial importance. Also of importance is the conservation of valuable organic solvents as well as conservation of the energy required to either recover or dispose of such solvents with a minimum effect on the surrounding community environment.

Illustrative aqueous based wire enamels are disclosed in detail in the co-pending application of Marvin A. Peterson, Ser. No. 501,932, filed Aug. 30, 1974, for "Aqueous Polyester Coating Composition." For a detailed discussion of such compositions, reference should be made to that application, and the disclosure of that application is incorporated herein by reference.

OBJECTS OF THE INVENTION

It is the principal object of the present invention to provide an improved aqueous based coating composition for application and cure in conventional commercial wire tower equipment to produce magnet wire having electrical, physical and chemical properties comparable to or better than magnet wire produced from presently known coating compositions.

Another object of the present invention is to provide an improved coating composition which can be applied to magnet wire in a wire tower at high linear speeds and under curing conditions compatible with the characteristics and properties of the base wire or substrate.

A further object is to provide a new and improved magnet wire enamel which is curable to a tough, flexible, dielectric, solvent resistant, thermally stable wire coating.

SUMMARY OF THE INVENTION

In accordance with the objects of the present invention, a new and improved aqueous based coating composition has been discovered which, when applied as a coating on magnet wire, such as copper or aluminum wire, and then cured in conventional wire tower equipment, results in magnet wire having an enamel coating thereon of a high quality providing electrical, physical and chemical properties such that the magnet wire is suitable for use in a wide variety of commercial applications. The magnet wire thus produced meets the tests for magnet wire outlined above.

The coating composition embodying the present invention comprises an aqueous solution of a water soluble polyester resin derived as the reaction product of principally commercial grades of neopentylglycol, trimethylolpropane, isophthalic acid, and trimellitic anhydride, in admixture with a water soluble orthoamic acid diamine oligomer derived as the reaction product of a diprimary diamine and a tetracarboxylic acid, such as the reaction product of methylenedianiline and 4,4'-(2-acetoxy-1,3-glyceryl)-bis-anhydrotrimellitate. The polyester resin and the orthoamic acid diamine oligomer are made water soluble by the use of a volatile, nitrogen containing base, such as ammonium hydroxide. The composition may include minor amounts of water soluble polymers such as phenol formaldehyde resins, melamine formaldehyde resins, epoxy resins and the like. Further, the composition may include accelerators such as a titanium chelate accelerator, and appropriate flow control agents to facilitate application to the wire substrate in wire tower equipment. A composition of the foregoing character is readily applied to magnet wire in a conventional wire tower apparatus and cured therein to form an enamel coating on the magnet wire.

DESCRIPTION OF THE PREFERRED EMBODIMENT

In accordance with the present invention, a new and improved magnet wire enamel utilizing an essentially aqueous solvent is prepared as the admixture of a water soluble polyester resin and a water soluble orthoamic acid diamine oligomer. Appropriate accelerators and flow control agents are added to the coating composition to enhance the use thereof in commercial wire tower equipment for applying the enamel to strands of wire, such as copper or aluminum wire, to produce magnet wire suitable for use in a wide variety of electrical applications such as motors, generators and other dynamo-electric machines. The improved aqueous based coating composition produced in accordance with this invention is particularly adapted for application and cure in conventional commercial wire tower equipment to produce magnet wire having electrical, physical and chemical properties comparable to or better than magnet wire produced from presently known coating compositions. The improved coating composition can be applied to magnet wire in a wire tower at high linear speeds and under curing conditions compatible with the characteristics and properties of the base wire substrate, and is curable to a tough, flexible, dielectric, solvent resistant, thermally stable wire coating.

The composition embodies essentially two components, a specific polyester resin and a specific amide acid diamine oligomer. The polyester resin component of the present invention is derived as the reaction product of a diol, triol, dicarboxylic acid and a tricarboxylic acid anhydride. More specifically, the preferred diol utilized in this invention is neopentylglycol, the preferred triol is trimethylolpropane or trimethylolethane or mixtures thereof, the preferred dicarboxylic acid is isophthalic acid, and the preferred tricarboxylic acid anhydride utilized in this invention is trimellitic anhydride. For some applications, an aliphatic acid such as adipic acid may be added in minor amounts.

The polyester resin is derived by reacting principally from about 18 to about 47 mole percent neopentylglycol, from about 8 to about 38 mole percent trimethylolpropane or trimethylolethane or mixtures thereof, from about 19 to about 38 mole percent isophthalic acid and from about 7 to about 14 mole percent trimellitic anhydride. If desired, up to about 14 mole percent adipic acid or other aliphatic acid may be added. More specifically, a preferred polyester resin is derived from the reaction of about 21 mole percent neopentylglycol, about 35.5 mole percent trimethylpropane, about 35.5 mole percent isophthalic acid, and about 8 mole percent trimellitic anhydride. The reactants utilized are commercial grade reagents, and most likely will contain additional related substances. For example, commercial isophthalic acid commonly includes from 5 to 25% by weight terephthalic acid.

The polyester resin is formed with an acid value of between about 45 and about 100, with a preferred range of 50 to 70. The resin is further designed to show an hydroxyl value of about 150 to about 300, with the preferred range being 250 to 300.

The orthoamic acid diamine oligomer component is derived from the reaction product of a diprimary diamine and a tetracarboxylic dianhydride. Again, the reactants are primarily a commercial grade of the materials. The oligomers are described in detail in co-pending application of Marvin A. Peterson, Ser. No. 475,483, filed June 3, 1974. For a more detailed discussion of such material, reference should be made to this application, the disclosure of which is incorporated herein by reference. More specifically, the preferred orthoamic acid diamine oligomer is derived from the reaction of the diamine methylene dianiline, with the dianhydride 4,4'(2-acetoxy-1,3-glyceryl)-bis-anhydrotrimellitate. The diamine and the dianhydride reactants are present in the reaction solution in the molar ratio of $m$ to $(m-1)$ respectively. where $m$ has a value of from 2 to about 7. When $m$ has a value of 2, the diamine and dianhydride are in the molar ratio of 2 to 1, thereby producing a diamide diacid diamine.

The polyester component and the orthoamic acid diamine oligomer component are admixed in a suitable solvent, in the ratio of polyester resin to diamine oligomer of from about 1 to about 20 to 1, and preferably about 9 to 1. The polyester resin and the diamine oligomer are, however, compatible in substantially all proportions.

Both the polyester resin and the diamine oligomer are initially either formed from the respective reactants in an organic solvent medium or are dissolved in a water-miscible solvent after formation of the resin. In each case, the organic solvent medium selected is a water miscible solvent such as N-methyl-2-pyrrolidone, ethylene glycol monobutyl ether (butyl cellosolve), and butyl alcohol. Appropriate surface active agents such as Igepal CO-630, may be added. The organic solvent solution, in each case, may be water solubilized, or the polyester and the diamine oligomer may be mixed and then water solubilized.

To make the resins water soluble, they are reacted with a volatile nitrogen containing base, such as ammonia, ($NH_3$), aqueous ammonia or ammonium hydroxide ($NH_4OH$), ammonium carbonate and primary or secondary aliphatic amines containing up to four carbon atoms, such as methylamine, ethylamine, secondary butylamine, isopropylamine, dimethylamine, diethylamine, dibutylamine, and the like. For a more detailed discussion of the solubilization of the polyester and diamine oligomer, see co-pending application Ser. No. 501,932 filed Aug. 30, 1974, by M. A. Peterson for "Aqueous Polyester Coating Composition."

The water-organic solutions of the polyester and diamine oligomer, or mixtures thereof, are then diluted with water to form appropriate aqueous-organic solutions having the desired solids content. The aqueous solution of the polyester resin is mixed with the aqueous solution of the diamine oligomer, in the desired weight ratios, to produce a wire enamel composition suitable for use in a wire tower. An appropriate curing accelerator may be added. For most applications, the solids content of the wire enamel thus produced should range from about 25 to about 40 percent by weight nonvolatile solids in an aqueous solution in which the solvent is constituted of at least about 80 percent water. The solution thus prepared is suitable for immediate use in a wire tower and yet has a substantial shelf life, thereby facilitating storage without danger of the enamel separating or coagulating into a gel.

The following examples are illustrative of the present invention:

EXAMPLE 1

In this example, there was used a 10 gallon stainless steel reactor equipped with a motor driven stirrer, electric heating, cooling coils, reflux condenser, inert gas inlet, and vapor exit line leading to a steam jet system capable of creating partial vacuum by Venturi action. With the vapor exit line closed and reflux condenser open, a slow stream of inert gas was started through the reactor and steam was started through the reflux condenser jacket. Eighteen pounds, 14 and one-half ounces (63.9 moles) of trimethylol-propane was charged to the reactor and heated to 250° F. (121° C.) to melt. Agitation was started and 8 pounds, 10 ounces (37.6 moles) of neopentylglycol was added. The batch was again heated to 250° F. (121° C.) and 21 ml. tetra-isopropyl titanate and 23 pounds, 2 and three-fourths ounces (63.3 moles) of isophthalic acid were added. The temperature was raised to 420° F. (216° C.) over 4 hours and held at 420° F. (216° C.) for an additional 1 hour and 30 minutes before cooling. The aqueous distillate that escaped during the process was continually condensed and collected and weighed 2.125 kg. The acid value of the resin was eleven.

With the resin temperature at 345° F. (174° C.), the vapor exit line was opened and the reflux line was closed. Six pounds, 1 and three-fourths ounces (14.4 moles) of trimellitic anhydride were added. The batch was held at 320°-340° F. (160°-170° C.) for 3 hours during which time, 50 g. (0.260 moles) of trimellitic anhydride were added. A small sample of the resin was removed from the reactor for hydroxyl determination, and the batch was thinned with 2,345 g. of N-methyl-2-pyrrolidone, 1,260 g. ethylene glycol monobutyl ether, and 2,345 g. n-butyl alcohol.

With the batch temperature at 200° F. (93.5° C.), a mixture of 7,770 g. of deionized water and 1,590 g. of 26° ammonium hydroxide were added.

The final product had a viscosity of Z3 and a color of 3 on the Gardner Holdt Scale. The pH was 8.3, the acid value was 55, the weight per gallon was 9.4 pounds (1.12 g./ml.). The percent solids as determined on a half-gram sample in an aluminum dish in a 300° F. (149° C.) oven for 90 minutes, was 58%. The hydroxyl value, as determined on a small sample that was removed just before addition of solvent, was 260.

EXAMPLE 2

In this example, a 20 gallon stainless steel vessel was used. Agitation was provided by a 4 inch blade operating at an indicator speed of 1000 RPM. The vessel was charged with 11.130 kg. n-methyl-2-pyrrolidone. During a 5 minute period, 11.13 kg. (56.2 moles) of methylene dianiline was added. The temperature of the solution was maintained at 38° C. To this solution was added 27.10 kg. of a freshly prepared solution of equal parts by weight N-methyl-2-pyrrolidone and Polydride 230, a commercial tradename of R. T. Vanderbilt Company for its resinous dianhydride 4,4'(2-acetoxy-1,3-glyceryl)-bis-anhydrotrimellitate, (28.1 moles of Polydride 230). After mixing for 15 minutes, the temperature had risen to 78° C.

The following blend was then added:
butyl cellosolve 1.451 kg.
N-methyl-2-pyrrolidone 8.338 kg.
deionized water 8.770 kg.
28% ammonium hydroxide 3.478 kg.
Mixing was continued for 15 minutes with the temperature at 76° C.
The following blend was then added:
butyl alcohol 2.962 kg.
IGEPAL CO-630 2.96 g.
N-methyl-2-pyrrolidone 0.148 kg.
Mixing was continued for another 15 minutes. Two batches were made in this manner and the two batches were blended. The solution contained 37% solids by weight, had a viscosity of 205 cps at 30° C., a pH of 8.1 and a density of 1.12 g./ml.

EXAMPLE 3

To a 20 gallon stainless steel vessel, equipped for agitation with a 4 inch blade operating at an indicator speed of 1000 RPM, there was charged 74 pounds (33.56 kg.) of the polyester prepared as described in Example 1. To this was added 36.65 pounds (16.6 kg.) of deionized water and agitation was continued for 15 minutes. Then 13.60 pounds (6.17 kg.) of the product of Example 2 was added over a period of 3 to 5 minutes and agitation was continued for another 15 minutes. The following mixture was then added to the vessel:
  9.93 pounds (4.5 kg.) deionized water
  2.83 pounds (1.28 kg.) N-methyl-2-pyrrolidone
  1.42 pounds (.64 kg.) N-butyl alcohol
  2.26 grams IGEPAL CO 630 (a polyethoxylated alkyl phenol surface active agent produced by General Aniline & Film Company).

Agitation was continued for another 15 minutes, to produce an enamel solution containing 33.75% solids by weight, having a Brookfield viscosity of 230 cps at 30° C., a surface tension of 39.6 dynes/cm. as measured on a Fisher Tensiometer Model 20, a pH of 7.5 and a density of 1.075 g./ml. Before use of the enamel solution in a wire tower, 401 g. of an accelerator "TYZOR" TE (a triethanolamine titanate product of E.I. DuPont de Nemours and Company) were added to the above-described batch.

Figures 1, 2:
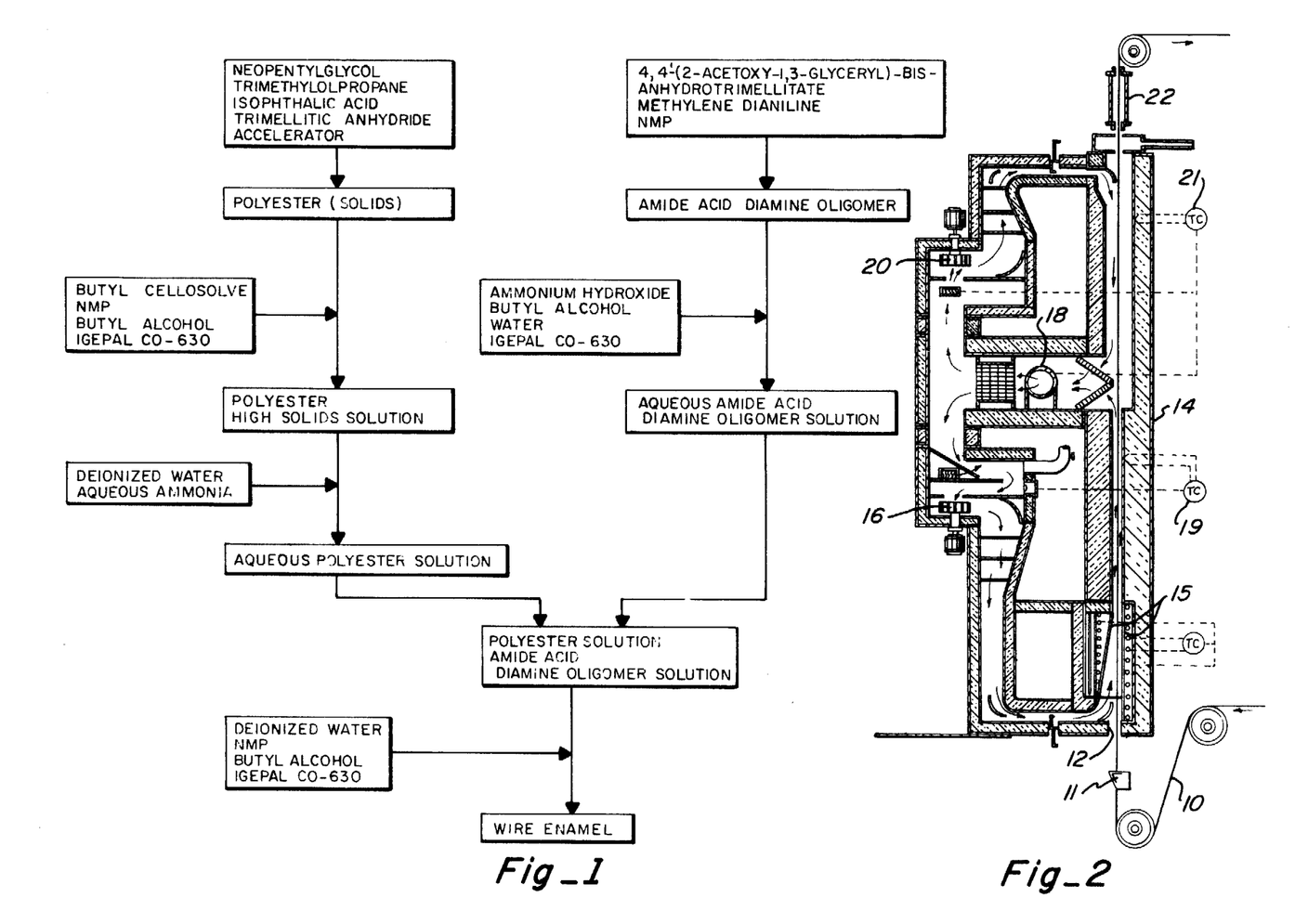
FIG. 1 is a block type flow diagram illustrating a process of forming the magnet wire enamel compositions embodying the present invention.
FIG. 2 is a generally schematic cross-sectional view of a wire tower for applying an enamel coating on wire.

Wire enamel prepared as described in Example 3 was applied as a coating enamel on magnet wire by utilizing a conventional commercial wire tower. The wire tower utilized was a "Shelbyville" 15-foot, controlled convection, combination gas and electric, wire enamel oven, of a type shown in U.S. Pat. Nos. 3,183,604 and 3,183,605, referred to above. Referring to FIG. 2, there is shown a generally schematic view of a "Shelbyville" type tower which receives bare magnet wire 10 to which a coating of the enamel composition is applied in an applicator 11. The coated wire with the wet enamel coating passes through an opening 12 in the bottom of the tower 14, where it is immediately subjected to radiant heat by opposed radiant heating panels 15 disposed on opposite sides of the wire 10. A fan 16 produces a flow of heated air in the lower portion or solvent removal zone of the tower 14. The air is heated by a suitable burner 18 or the like, and the temperature of the air is controlled by a thermo-couple control 19 positioned generally in the bottom of the tower adjacent the exit end of the solvent removal zone and downstream of the radiant panels 15. After the wire 10 passes through the solvent removal zone, it continues upwardly through the upper portion or curing zone of the tower where the enamel is polymerized or baked prior to leaving the furnace. Heated air is circulated through the upper or curing zone by a fan 20, and the temperature of the air in the curing zone is controlled by a thermocouple control 21 positioned near the upper end of the tower. The insulated wire passes out of the tower through a convection cooler 22 which reduces the wire temperature so that the wire can be wound on suitable spools. For a more detailed discussion of the operation of a "Shelbyville" type wire tower, reference should be made to the above patents.

The enamel coated wire may be provided with an overcoat, such as nylon, as well as a lubricating agent in order to enhance the utility of the magnet wire for winding coils, for example, for producing stators and rotors for dynamoelectric machines.

Table I presents data obtained by utilizing the wire enamels prepared as described above in a "Shelbyville" type tower. The wire tower conditions utilized in preparation of the insulated wire referred to in Table I included wire speeds ranging from 70 to 80 f.p.m. for copper wire and from 38 to 50 f.p.m. for aluminum wire, and temperatures of 490°–530° C. at the radiant panels, 380°–420° C. at the top and 250°–315° C. at the bottom of the tower. The wire was subjected to conventional preparation and preannealing prior to application of the enamel coating. Various properties of the coated and cured wire thus obtained were determined and are set forth in the table. The results presented in Table I clearly demonstrate the efficacy of the within described compositions embodying the present invention for producing high quality insulated magnet wire. The properties compare favorably with magnet wire produced by prior art compositions and meet the standards and specifications required for the production of magnet wire in commercial quantities.

TABLE I

| | | | Al | Al | Al |
|---|---|---|---|---|---|
| (1) | Wire Type | Standards | | | |
| (2) | Wire Diam., in. | for | .0423 | .0423 | .0566 |
| (3) | Overcoat Type | Magnet | nylon | nylon | nylon |
| (4) | Over. Build, in. | Wire | .0004 | .0004 | .0004 |
| (5) | Coating Build on Diam., in. | | .0027– | .0028– | .0031– |
| (6) | Flexibility, 15% + 1X on Al; 25% + 1X on Cu | P-15% + 3X on Al; 25% + 3X on Cu | 3P | 2P 1F | 3P |
| | 15% + 2X on Al; 25% + 2X on Cu | | | | |
| (7) | Heat Shock 1X at 155° C. | P-5X | 3P | 3P | 3P |
| | 2X at 155° C. | P-5X | 3P | 3P | 3P |
| (8) | Dielectric Strength, v. | 1500 v./mil | 8.4 | 12.4 | 14.2 |
| | | | 10.2 | 11.7 | 10.0 |
| | | | 9.3 | 12.3 | 12.8 |
| (9) | Repeated scrape, strokes | 10 minimum | 34 | 34 | 46 |
| | | 20 average | 35 | 38 | 37 |
| | | of 3 | 32 | 32 | 29 |
| (10) | Cut through, ° C. 1000g. load | 215° C. | 338 | 266 | 350+ |
| | | | 302 | 306 | 228 |
| | | | 334 | 315 | 252 |

TABLE I-continued

|  |  |  | 242 | 316 | 350+ |
|---|---|---|---|---|---|
|  |  |  | 332 | 317 | 214 |
| (11) 50/50 Solvent, 10 mins. | P |  | P | P | P |
| (12) 70/30 Solvent, 5 mins. | P |  | P | P | P |
| (13) Heat aging, 100 hrs.* |  |  |  |  |  |
| at 175° C., 3X (without nylon) | P-(without nylon) |  | 3P | 3P | 3P |
| 4X (without nylon) | P-(without nylon) |  | 3P | 3P | 3P |
| Dielectric Strength, v. | Retain % |  | 12.5 | 16.0 | 13.8 |
|  |  |  | 15.3 | 13.9 | 15.2 |
|  |  |  | 15.1 | 14.0 | 9.4 |
| (14) Snap Elongation | P |  | P | P | P |

| | | | | | | | | |
|---|---|---|---|---|---|---|---|---|
| (1) Al | Cu | Cu | Cu | Cu | Cu | Cu | Al | Al |
| (2) .0566 | .0284 | .0284 | .0224 | .0224 | .0251 | .0251 | .0250 | .0250 |
| (3) nylon | nylon | nylon | nylon | nylon | nylon | nylon | nylon | nylon |
| (4) .0006 | .0004 | .0003 | .0003 | .0003 | .0004 | .0004 | .0004 | .0004 |
| (5) .0030–.0031 | .0023–.0026 | .0022–.0026 | .0024–.0025 | .0022–.0024 | .0023–.0024 | .0023–.0024 | .0028–.0031 | .0028–.0031 |
| (6) 3P | 3P | 3P | 3P | 3P | 2P 1F / 3P | 2P 1F / 3P | 3F / 3P | 3P / — |
| (7) 2P 1F / 3P | 3P / 3P | 3P / 3P | 3P / 3P | 3P / 3P | 2P 1F / 3P | 3P / 3P | 2P 1F / 2P 1F | 3F / 3P |
| (8) 11.7 | 11.2 | 12.4 | 11.2 | 9.0 |  |  |  |  |
| 13.2 | 9.6 | 10.7 | 12.7 | 9.4 |  |  |  |  |
| 10.1 | 9.0 | 10.9 | 11.5 | 9.0 |  |  |  |  |
| (9) 32 | 46 | 49 | 38 | 29 | 25 | 31 | 100+ | 63 |
| 38 | 43 | 32 | 28 | 22 | 27 | 25 | 100+ | 40 |
| 29 | 47 | 44 | 49 | 26 | 33 | 41 | 100+ | 54 |
| (10) 350+ | 316 | 287 | 270 | 260 | 253 | 240 | 282 | 312 |
| 350+ | 297 | 298 | 307 | 258 | 256 | 251 | 276 | 305 |
| 350+ | 311 | 287 | 283 | 251 | 245 | 251 | 270 | 288 |
| 238 | 314 | 289 | 266 | 269 | 266 | 242 | 282 | 278 |
| 350+ | 309 | 306 | 253 | 267 | 257 | 251 | 309 | 292 |
| (11) P | P | P | P | P | P | P | P | P |
| (12) P | P | P | P | P | P | P | P | P |
| (13) |  |  |  |  |  |  |  |  |
| 3P | 3P | 3P | 3P | 3P | P | P | P | P |
| 3P | 3P | 3P | 3P | 3P | P | P | P | P |
| 13.4 | 15.1 | 9.8 | 14.3 | 14.8 | 9.6 | 15.4 | 13.4 | 16.6 |
| 10.3 | 10.2 | 11.9 | 13.4 | 10.2 | 8.6 | 14.4 | 13.7 | 14.8 |
| 10.9 | 13.2 | 12.7 | 15.6 | 13.1 | 13.1 | 14.8 | 14.3 | 14.3 |
| (14) P | P | P | P | P | P | P | P | P |

*Heat aging test is conducted without nylon overcoat

A further test illustrating the effectiveness of the magnet wire insulation coating produced according to the present invention is the Locked Rotor Burnout Test. Magnet wire is wound into a stator which is then assembled into a motor. The rotor is locked to prevent rotation and a current is applied to the stator. The time to failure and winding temperature is measured. In Locked Rotor Burnout Tests conducted on stators with 0.0359 Cu main windings and 0.0159 Cu start windings, utilizing either Alkanex or the composition of the present invention as the magnet wire insulation, the Alkanex insulated wire typically burns out in about 50 sec., while magnet wire insulated with the composition of the present invention both with and without use of the accelerator in the enamel, lasts nearly 10 times longer, or on the average of between 490 and 500 seconds. In one series of tests, the temperature of the start windings and main windings at 50 seconds were 360° and 100° C. respectively, and after 500 seconds the temperatures were 470° and 290° C. respectively.

While certain illustrative magnet wire coating compositions for use in the production of enamel coated magnet wire in commercial wire tower equipment have been described above in considerable detail, it should be understood that there is no intention to limit the invention to the specific compositions which have been disclosed by way of illustration. On the contrary, the intention is to cover all modifications, alternatives, equivalents and uses falling within the spirit and scope of the invention as expressed in the appended claims.

We claim:

1. A coating composition for application to magnet wire in a wire tower, comprising an aqueous solution of
   a. a water soluble polyester resin comprising the reaction product of
      neopentylglycol,
      trimethylolpropane,
      isophthalic acid, and
      trimellitic anhydride,
   said reactants being in proportions such that the polyester resin has an acid value of between about 45 and about 100, and a hydroxyl value of between about 150 to about 300; and
   b. a water soluble orthoamic acid diamine oligomer comprising the reaction product of
      $m$ moles methylene dianiline, and
      $(m-1)$ moles 4,4'-(2-acetoxy-1,3-glyceryl)-bis-anhydrotrimellitate, where $m$ has a value of from 2 to 7;
   a coating of said aqueous solution on a wire substrate being curable upon the application of heat to form magnet wire having a cured resin coating thereon.

2. The coating composition defined in claim 1 wherein the solids content is from about 25% to about 40% by weight.

3. The coating composition defined in claim 1 wherein said orthoamic acid diamine oligomer and said polyester resin are in the proportion of about 1 to 9 respectively.

4. The coating composition of claim 1 wherein said polyester resin is the reaction product of
   18 to 47 mole percent neopentylglycol 8 to 38 mole percent trimethylolpropane
19 to 38 mole percent isophthalic acid
7 to 14 mole percent trimellitic anhydride.

5. The coating composition of claim 1 wherein said polyester resin is the reaction product of
21 mole percent neopentylglycol
35.5 mole percent trimethylolpropane
35.5 mole percent isophthalic acid
8 mole percent trimellitic anhydride.

6. The coating composition of claim 1 wherein said polyester resin and said diamine oligomer are water solubilized by the addition thereto of a volatile nitrogen containing base.

7. The coating composition defined in claim 6 wherein said polyester resin and said diamine oligomer are water solubilized by the reaction thereof with a volatile nitrogen containing base prior to admixture.

8. The coating composition defined in claim 6 wherein said volatile nitrogen containing base is ammonium hydroxide.

9. The coating composition of claim 1 wherein said polyester resin has an acid number of about 55 and a hydroxyl number of about 260.

10. The coating composition of claim 1 further including a titanium chelate accelerator.

11. The coating composition of claim 1 further including a flow control agent.

12. The coating composition of claim 1 wherein the solution solvent is at least about 80% water.

13. Magnet wire comprising a wire substrate having a coating thereon produced by the application and cure of the composition defined in claim 1 on the wire substrate in a wire tower.

14. The coating composition of claim 1 produced by forming said polyester resin, dissolving said resin in an organic water miscible solvent system, adding a volatile nitrogen containing base to said polyester system in an amount sufficient to render said polyester water soluble, and adding water to form an aqueous polyester solution; forming said diamine oligomer in an organic water miscible solvent system, adding a volatile nitrogen containing base to said oligomer system in an amount sufficient to render said orthoamic acid diamine oligomer water soluble, and adding water to form an aqueous diamine oligomer solution; and admixing said aqueous polyester and diamine oligomer solutions to form a coating composition suitable for wire tower application onto magnet wire.

15. The coating composition of claim 14 wherein said polyester and said diamine oligomer are admixed in the weight ratio of about 9 to 1 respectively, to form a coating composition having a solids content of between about 30% and about 35% by weight.

16. The coating composition defined in claim 1 produced by forming said polyester resin and dissolving said resin in an organic water miscible solvent system, forming said diamine oligomer in an organic water miscible solvent system, admixing said polyester system with said diamine oligomer system in the ratio of 9 parts by weight polyester to 1 part by weight diamine oligomer, adding a volatile nitrogen containing base to said admixture in an amount sufficient to render said polyester and said diamine oligomer water soluble, and diluting said system with water in an amount such that the solvent is at least about 80% by weight water.

17. A coating composition for application to magnet wire in a wire tower, comprising an aqueous solution of
 a. a water soluble polyester resin derived as the reaction product of:
  18 to 47 mole percent neopentylglycol,
  8 to 38 mole percent trimethylolpropane or trimethylolethane or mixtures thereof,
  19 to 38 mole percent isophthalic acid,
  0 to 14 mole percent adipic acid, and
  7 to 14 mole percent trimellitic anhydride; and
 b. a water soluble orthoamic acid diamine oligomer derived as the reaction product of:
  $m$ moles methylene dianiline, and
  ($m$-1) moles 4,4'-(2-acetoxy-1,3-glyceryl)-bis-anhydrotrimellitate, where $m$ has a value of from 2 to about 7;
said polyester having an acid value of from about 50 to about 70 and a hydroxyl value of from about 250 to about 300; said coating composition having a solids content of from about 25% to about 40% by weight; and said polyester resin and said orthoamic acid diamine oligomer being in the weight proportion of about 1 to about 20 to 1 respectively.

18. The coating composition of claim 17 further including a titanium chelate accelerator.

19. The coating composition of claim 17 further including a flow control agent.

20. The coating composition of claim 17 wherein the solution solvent is at least about 80% water.

21. Magnet wire comprising a wire substrate having a coating thereon produced by the application and cure of a coating of the composition defined in claim 17 on the wire substrate in a wire tower.

22. The coating composition of claim 17 produced by forming said polyester resin dissolving said resin in an organic water miscible solvent system, adding a volatile nitrogen containing base to said polyester system in an amount sufficient to render said polyester water soluble, and adding water to form an aqueous polyester solution; forming said diamine oligomer in an organic water miscible solvent system, adding a volatile nitrogen containing base to said oligomer system in an amount sufficient to render said orthoamic acid diamine oligomer water soluble, and adding water to form an aqueous diamine oligomer solution; and admixing said aqueous polyester and diamine oligomer solutions to form a coating composition suitable for wire tower application onto magnet wire.

23. Magnet wire as defined in claim 13 including a Nylon overcoating thereon.

24. Magnet wire as defined in claim 13 including a lubricant coating thereon.

25. Magnet wire comprising a wire substrate having a coating thereon produced by the application and cure of a coating of the composition defined in claim 10 on the wire substrate in a wire tower.

26. Magnet wire as defined in claim 25 including a Nylon overcoating thereon.

27. Magnet wire as defined in claim 21 including a Nylon overcoating thereon.

28. Magnet wire as defined in claim 21 including a lubricant coating thereon.

29. Magnet wire comprising a wire substrate having a coating thereon produced by the application and cure of a coating of the composition defined in claim 18 on the wire substrate in a wire tower.

30. Magnet wire as defined in claim 29 including a Nylon overcoating thereon.

* * * * *

UNITED STATES PATENT AND TRADEMARK OFFICE
CERTIFICATE OF CORRECTION

PATENT NO. : 4,004,063

DATED : January 18, 1977

INVENTOR(S) : Marvin A. Peterson & Oliver I. Cline

It is certified that error appears in the above-identified patent and that said Letters Patent are hereby corrected as shown below:

Col. 8, line 25, delete "dynamo-electric" and insert --dynamoelectric--.

Col. 9, line 21, delete "." (period) and insert --,-- (comma).

Col. 10, line 18, delete "trimethylol-propane" and insert --trimethylolpropane--.

Col. 11, line 3, delete "8.338" and insert --.338--.

Table I, between (5) and (6), under ".0027-", ".0028-", and ".0031-" insert --.0032--, --.0030--, and --.0032--.

Col. 14, line 54, beginning with the word "where" start new line.

Signed and Sealed this

Fourteenth Day of June 1977

[SEAL]

Attest:

RUTH C. MASON
Attesting Officer

C. MARSHALL DANN
Commissioner of Patents and Trademarks